(12) United States Patent
Kinzenbaw

(10) Patent No.: US 10,071,669 B2
(45) Date of Patent: Sep. 11, 2018

(54) GRAIN CART WITH AUGER DELIVERY ON EITHER SIDE

(71) Applicant: KINZE MANUFACTURING, INC., Williamsburg, IA (US)

(72) Inventor: Jon Kinzenbaw, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 3 days.

(21) Appl. No.: 14/603,954

(22) Filed: Jan. 23, 2015

(65) Prior Publication Data

US 2015/0203019 A1 Jul. 23, 2015

Related U.S. Application Data

(60) Provisional application No. 61/930,550, filed on Jan. 23, 2014.

(51) Int. Cl.
| | |
|---|---|
| *B65F 1/00* | (2006.01) |
| *B60P 1/42* | (2006.01) |
| *B65G 33/10* | (2006.01) |
| *B65G 53/48* | (2006.01) |
| *B65G 65/00* | (2006.01) |
| *B65G 67/24* | (2006.01) |

(52) U.S. Cl.
CPC .............. *B60P 1/42* (2013.01); *B65G 33/10* (2013.01); *B65G 53/48* (2013.01); *B65G 65/005* (2013.01); *B65G 67/24* (2013.01)

(58) Field of Classification Search
CPC .......................................................... B60P 1/40
USPC .................................. 414/526, 491, 509, 523
See application file for complete search history.

(56) References Cited

U.S. PATENT DOCUMENTS

| | | |
|---|---|---|
| 2,960,320 A | 11/1960 | Heider |
| 3,717,272 A | 2/1973 | Chartier et al. |
| 2011/0164952 A1 | 7/2011 | Hollenberg |

OTHER PUBLICATIONS

International Searching Authority Search Report, Issued in connection to International Application No. PCT/US2015/012645, dated Aug. 10, 2015, 15 pages Aug. 10, 2015.

*Primary Examiner* — Saul Rodriguez
*Assistant Examiner* — Willie Berry, Jr.
(74) *Attorney, Agent, or Firm* — McKee, Voorhees & Sease, PLC

(57) ABSTRACT

An agricultural wagon for moving particulate material from within the wagon to a separate storage vessel is provided. The wagon includes a bin defined by walls. The wagon may also include one or two augers, such as a floor and lift auger for moving the material from within the bin to the storage vessel. The lift auger is movable relative to the storage bin such that it can dispense the material via a hood from either the left or right sides of the bin, such as at either the left or right and front corners of the bin. A mechanism including actuators and a guide can aid in moving the auger to the desired side for dispensing. The lift auger can further be folded in front of the bin when in a transport configuration, such as traveling on a road.

8 Claims, 12 Drawing Sheets

GRAIN CART WITH AUGER DELIVERY ON EITHER SIDE

CROSS-REFERENCE TO RELATED APPLICATIONS

This application claims priority under 35 U.S.C. § 119 to provisional application Ser. No. 61/930,550, filed Jan. 23, 2014, herein incorporated by reference in its entirety.

FIELD OF THE INVENTION

The invention relates generally to mobile carts for receiving, transporting and offloading particulate material. More particularly, but not exclusively, the invention relates to a grain cart capable of delivering a particulate material on either side of the cart.

BACKGROUND OF THE INVENTION

Agricultural wagons, such as grain carts, aid in the harvesting of agricultural products such as corn, beans, or other crop (collectively "particulate material"). The grain carts are configured to receive the harvested grain from a combine or other implement so that the combine can continue to harvest the grain. Many times, a grain cart will move alongside a combine as the combine harvests grain so that the combine can deliver harvested grain to the cart such that the combine will be able to continue to harvest without having to stop to empty its hopper or hoppers. Once the combine hopper has been transported to the grain cart, the grain cart is able to transport the grain to a storage or transport vessel, such as a semi-trailer.

Augers are generally used to transport the grain from the grain cart to the storage vessel. A vertical or lift auger is positioned on or in the grain cart with one end in or near the grain, and the other end extending generally upwardly and outwardly from the cart. The positioning of the lift auger allows the grain to be moved from the storage area of the grain cart to the trailer. The lift auger may also be adjustable or movable such that the auger can be directed to aim the grain towards trailers of differing heights, sizes, or the like. The adjustability also allows the grain to be directed to exact locations within the trailer or area.

Early grain wagon designs placed the lift, unloading, or discharge auger at the side of the wagon's bin. Later designs located the unloading auger on a front corner of the bin to position the discharge end of the unloading auger in a location more easily seen by the operator of a tractor pulling the grain wagon. To reduce the size of the grain wagon for facilitating storage and transport to and from a field, the unloading auger is typically comprised of upper and lower sections, which are pivotally coupled such as by a hinge. The upper auger section is adapted for folding to a position in closely spaced relation to the wagon's bin. In the case of a side discharge wagon, the upper section of its folding auger is not clearly visible to the vehicle operator who must be careful to avoid contact between the auger and the offloading truck. This generally requires the operator to unfold the auger well away from the truck and to then move the wagon in position relative to the truck for unloading. This latter operation is rendered more difficult by exhaust pipes and other structures, which frequently project upward, from larger trucks. Corner auger wagons overcome this problem by folding the upper auger section across the front of the wagon to allow the operator to clearly see the auger as it is moved to the extended, or unloading, position.

The lift or unload augers have traditionally been fixed in position on the left side of the storage bin, when viewed with the direction of travel. This has allowed a vehicle operator to view the storage bin outside the left window of the tractor or via a mirror on the left side of the tractor. This may have been in keeping with other vehicles in which the driver side is on the left of the vehicle. However, many modern tractors include controls, displays, and other items on the right side of the cab. Therefore, an operator will need to continually move back and forth between the left side to view the position of the lift auger, and the right side to view the tractor controls, displays, etc. This can create undesired motion and work, and could lead to accidents if the operator spends too much time looking at one side and not the other.

Therefore, there is a need in the art for an agricultural wagon that includes an unload auger that can be moved to either side or corner of the wagon, to provide a vehicle operator with choices to monitor the location of said auger.

SUMMARY OF THE INVENTION

It is therefore a primary object, feature, and/or advantage of the present invention to overcome the deficiencies in the art.

It is another object, feature, and/or advantage of the present invention to provide an improved mobile cart for receiving, transporting, and offloading particulate material such as grain when used in agricultural applications.

It is yet another object, feature, and/or advantage of the present invention to provide an agricultural wagon that can accommodate a tractor having controls on either side of the cab.

It is still another object, feature, and/or advantage of the present invention to provide an agricultural wagon that includes an unload auger that can move from one side of the wagon to the other to facilitate unloading at either side.

It is a further object, feature, and/or advantage of the present invention to provide a lift auger that can be folded in multiple directions.

It is still a further object, feature, and/or advantage of the present invention to provide an auger hood that can be rotated, flipped, or otherwise manipulated to direct a particulate material in a plurality of directions.

It is yet a further object, feature, and/or advantage of the present invention to provide an agricultural wagon that can be quickly and easily manipulated to unload grain in a plurality of directions.

These and/or other objects, features, and advantages of the present invention will be apparent to those skilled in the art. The present invention is not to be limited to or by these objects, features and advantages. No single embodiment need provide each and every object, feature, or advantage.

Accordingly, an aspect of the invention includes an agricultural wagon, which may be known as a grain cart. The grain cart includes a storage bin defined by front, rear, and opposite side walls. The cart may also have a floor for holding a particulate material, wheels for supporting the bin, as well as a tongue, hitch, or other member for attaching the wagon to a vehicle, such as a tractor. The cart may include a first auger, which may also be known as a floor auger. The floor auger can be positioned within the bin, or outside the bin with a hole in the floor to allow the material to communicate with the floor auger. The floor auger is configured to move the material in a generally forward or rearward manner and towards a second or lift auger, which is operatively connected to and in communication with the floor auger.

The lift auger is configured to move the particulate material from the storage bin to another vessel outside of the grain cart, and can be positioned adjacent the front or rear of the cart. In addition, the lift auger is configured to be movable relative to the sides of the cart. For example, the lift auger is movable in a generally side-to-side manner and can be positioned at either front or rear corner of the grain cart. When the lift is positioned at the front of the cart, the auger can be moved from one front corner to the other, making the dispensement of the particulate material occur on the left or right side of the grain cart when viewed in relation to the direction of travel of the cart and vehicle. This allows the position of the lift auger to be at a position at the left front corner of the cart, as is common.

However, the present invention further includes a controller or control mechanism that allows the lift auger to move, which may be in a swivel or rotational manner, towards the opposite side of the storage bin. This allows the lift auger to be positioned at the opposite corner, which is the right, front corner of the cart. The movement of the lift auger allows the operator to position the auger at a location most convenient to them, such as on the same side as the controls of a tractor. However, if a limitation in the field or other environment only provides access for the auger on the opposite side, the operator can quickly and easily manipulate the position of the auger accordingly.

In addition, an aspect of the invention includes that the lift auger includes a pivot along the length of the auger. The pivot allows the auger to be folded to a position generally in front or behind the grain cart such that, in a transport position, the auger is folded generally within the front or rear profile of the grain cart. When needed for delivering the material from the cart, the auger can become unfolded to extend the auger above and away from the storage bin such that the hood of the auger can direct the material from the auger and towards/into a storage vessel.

Figure 1:
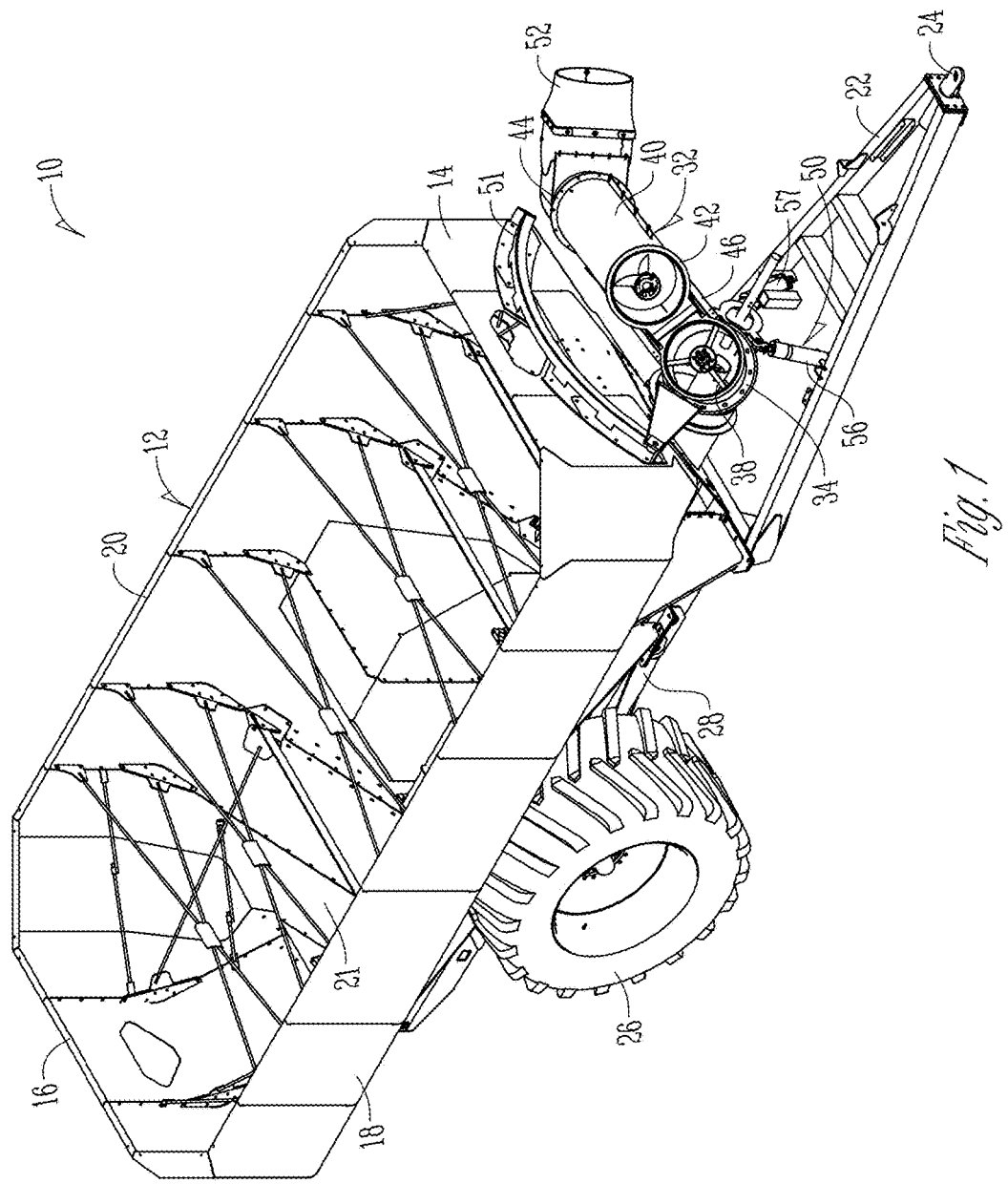
FIG. 1 is a perspective view of an agricultural wagon with a lift auger in a transport position.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENTS

The present invention is directed towards agricultural wagons used to receive, store, and transport a particulate material, such as grain. The wagons of the present invention may also be referred to as grain wagons or grain carts. Grain carts are used generally to receive the grain or other material from a vehicle such as a combine. The combine, which is used to harvest an agricultural product, separates the product and dispenses the grain therefrom. The dispensed grain can be stored within the grain cart and the grain cart can be filled up subject to a measurement, such as a weight or volume. Once filled, the grain cart, which is generally pulled by a vehicle such as a tractor, can be transported to another location within, around, or away from a field. The product within the grain cart, e.g., grain, can then either be stored in the cart for a later use, or can be dispensed from the cart to another storage vessel. For example, a storage vessel may be a semi-trailer or other trailer for hauling the product to a final storage location. Otherwise, the grain cart can dispense the material directly from the cart and into a final storage vessel. To accomplish the dispensing, the grain cart utilize one or more augers to move the product from within a storage bin of the grain cart to a location outside the grain cart.

Grain carts generally include at least a lift auger. A lift auger is an auger that moves material from a storage bin of the grain cart upwards and generally away from the storage bin to a location for dispensing the grain. Generally, the lift augers are positioned at the front or side of the grain cart. For example, the auger may be positioned at a left side or left, front corner of a grain cart. The designation of the left side of the grain cart is the side the cart in relation to the direction of travel of the cart. The positioning of the lift auger at the left side or left corner of the grain cart allows the operator in the tractor to be able to see the location of the dispensement of the material from the lift auger and into the storage vessel. However, with tractors and other vehicles including more controls in the right side of the cab for the operator, it is difficult for the operator to constantly look back and forth to the right and left to keep an eye on both the controls for the tractor and the dispensing of the grain from the grain cart lift auger, while also watching in the direction of travel. Therefore, the grain cart 10 depicted in the figures of the invention provide solutions to at least this issue.

As will be understood, the grain cart 10 of the present invention includes a lift auger 32 that is positioned at a front corner of the grain cart 10, such as at the front, left or front, right corner of the grain cart 10. The lift auger 32 of the grain cart 10 can be moved from one front corner to the other front corner, as well as to locations therebetween. The movement allows the operator to position the lift auger 32 at either side or corner of the grain cart 10 for dispensing the material stored within, which provides a more convenient method of dispensing for the operator. It also provides for the selection of the side of dispensement from the grain cart 10 based upon an operator's preference, location of storage vessel, terrain, as well as additional factors associated with the field, location, and/or dispensing operation.

FIGS. 1-7 show a grain cart according to aspects of the present invention. The grain cart 10 shown in FIGS. 1-7 includes a storage bin 12 defined, in part, by walls. For example, the walls may include a front wall 14, rear wall 16, right wall 18, and left wall 20. As mentioned, the designations of left and right are relative to the direction of travel of the grain cart 10. However, it will be appreciated that the terms could be reversed if viewed by looking at the front of the grain cart 10. The grain cart 10 may also include a floor or portion of a floor 21. The storage bin 12 receives the grain or other material and holds said material therein until time of dispensing. Also shown is a tongue 22 extending from a frame 28, which supports the storage bin 12. The frame 28 may be a unitary member, or can comprise multiple members, such as to allow independent steering of multiple sets of wheels. For example, when forward and rear wheels are included, the axles of the wheels may be able to move or turn independent of one another. At a forward end of the tongue 22 is a hitch 24 for attaching the agricultural wagon or grain cart 10 to a towing vehicle, such as a tractor. The grain cart 10 is also supported and movable by the inclusion of wheels 26. While the figures show the use of only two wheels, it should be appreciated that the present invention contemplates any number of wheels may be used to support and allow movement for the grain cart 10. In addition, it is contemplated that tracks be used instead of wheels, with the tracks being steerable as well.

The grain cart 10 can be operatively connectable to a tractor or other towing vehicle via the control box 25. The control box 25 may include a hook up to a power support, such as a power take off of a tractor, an electrical supply, a pneumatic supply, a hydraulic supply, or some combination thereof. The control box 25 may also include controls such as electronic controls, hydraulic controls, pneumatic controls, or the like. These controls may operate the various aspects of the grain cart 10. For example, the control box 25 may include electric controls to control the movement of the augers. Sensors may also be included to constantly update the weight or volume of the product within the storage bin 12. Furthermore, additional aspects such as fans for drying the product and hydraulic controls for controlling hydraulic actuators for the augers and other components of the grain cart 10 may be operated and controlled by the control box 25. The control box may take different forms and include different aspects of the invention. For example, the control box may take the form of a grain transfer case that includes a connecting portion for attaching to the tractor.

To move the product from within the storage bin 12 to another vessel, the grain cart 10 incorporates the use of first and second augers 30, 32, which can also be referred to as floor and lift augers, among other terms. However, it is to be appreciated that the invention contemplates that only a lift auger 32 may be used with the present invention, and the first or floor auger 30 may be removed, while still keeping the scope of the invention intact. As shown in the figures, the floor auger 30 is included as part of the grain cart 10. The floor auger 30 is positioned generally in line with the longitudinal axis of the storage bin 12. The first or floor auger 30 may be positioned within the storage bin 12 or may be placed outside the storage bin 12, such as underneath the storage bin 12. In such a case, the floor 21 of the storage bin 12 may include one or more holes or apertures to allow the grain or other product to fall from the storage bin 12 and into contact or communication with the auger 30. The auger 30 operates as a standard auger in utilizing a rotational movement of the auger to move the material in a rear to front manner. Thus, as shown in the figures, the operation of the floor auger 30 will move the material from the direction from the rear wall 16 towards the front wall 14. However, it should be appreciated that, in some instances, the auger 30 may be used in the reverse manner to move material from the front of the grain cart 10 towards the rear grain cart 10. In such cases, as will be understood, the lift auger 32 may be placed at the rear of the grain cart 10.

Figure 10:
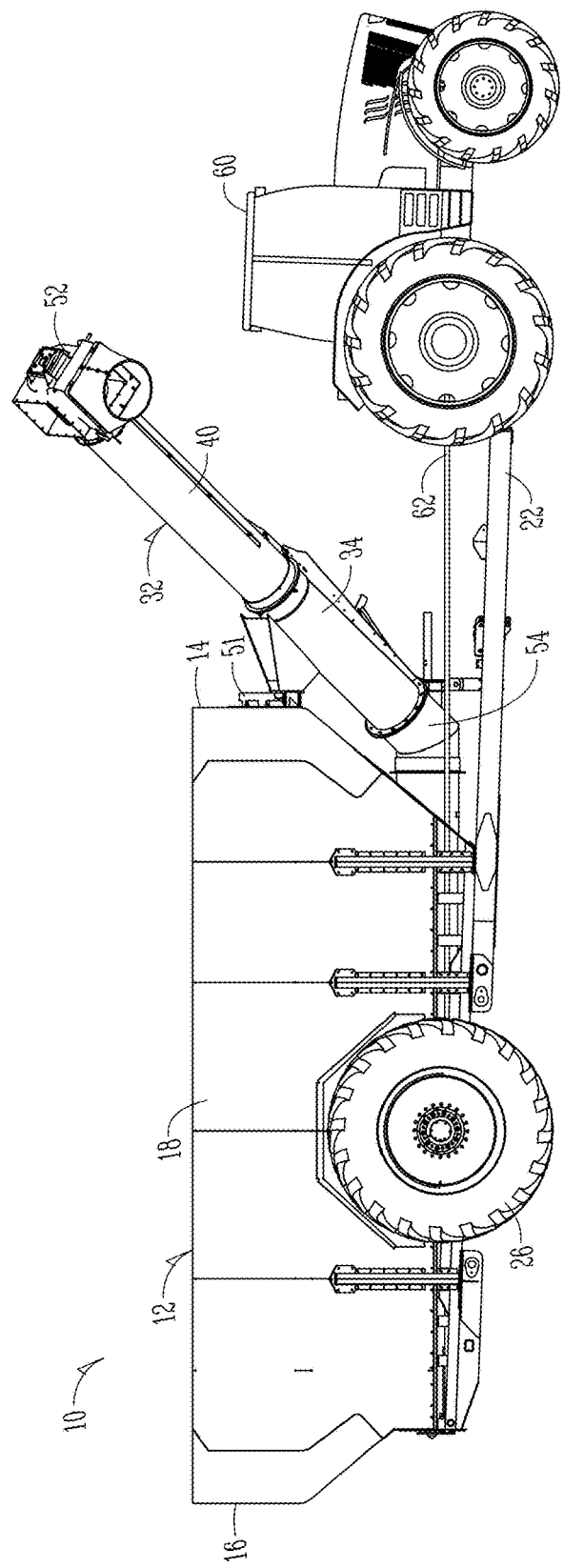
FIG. 10 is a view of a tractor connector to an agricultural wagon including aspects of the present invention.
Figure 11:
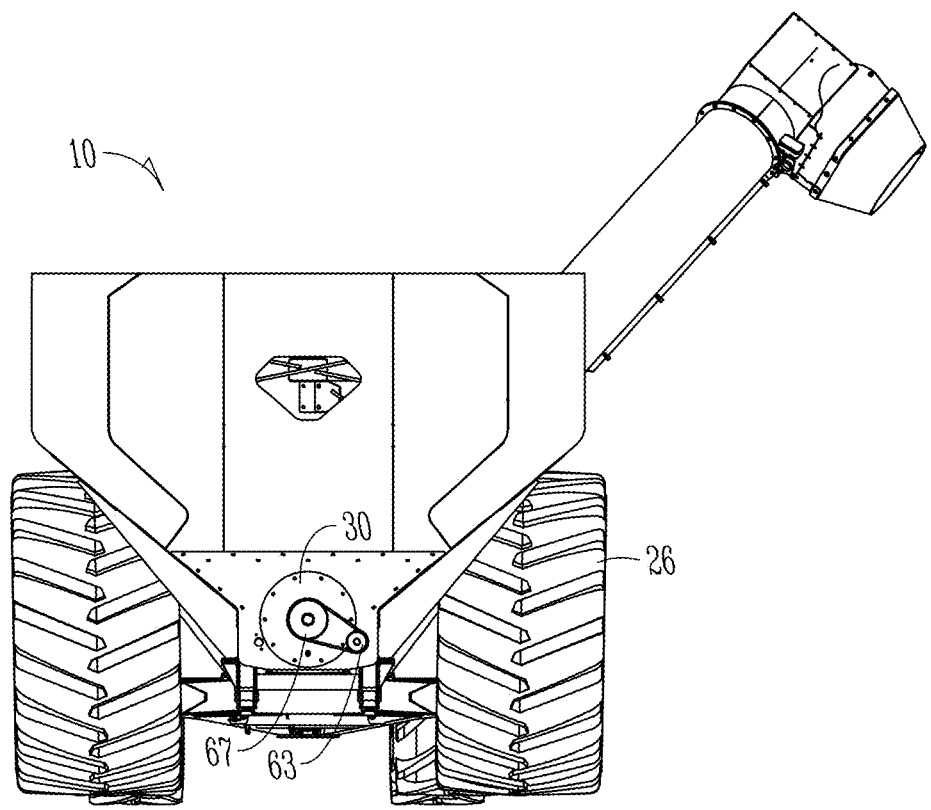
FIG. 11 is a rear view of the wagon of FIG. 10.

Operation of the floor auger 30 may be driven by a tractor, such as by the power takeoff output 62 of the tractor 60. Such a configuration is shown in FIGS. 10 and 11. The power takeoff 62 can be connected to a drive shaft 63, which is operatively connected to a belt chain, gear chain, or other driven mechanism 67, which is turn, is operatively connected to the auger 30, such as by being connected to an auger drive. Thus, rotation of the drive shaft 63 by the power takeoff 62 will cause the driven mechanism 67 to rotate, which will in turn, rotate the floor auger 30.

In the grain cart 10 shown in the figures, operatively connected to the floor auger 30 is a lift auger 32. The lift auger 32 shown in FIGS. 1-7 is positioned generally at a front corner of the storage bin 12, and being outside the storage bin 12. This allows for the greatest amount of volume within the storage bin 12, as the lift auger will not take up space within the grain bin 12. However, a portion of or the entire lift auger 32 may be positioned within the storage bin 12, in some instances. The lift auger 32 is in communication with the floor auger 30 such that the grain moved by the floor auger 30 will be communicated to the auger of the lift auger 32. The lift auger 32 moves the material from a lower position to an upper position and out the location of the lift auger 32, such as at a location designated by the hood 52. The hood 52 is utilized to direct the flow of the dispensing of the grain from the lift auger 32. Thus, a communication is provided by the floor and lift augers 30, 32 to move the material from within the storage bin 12 of the grain cart 10 and out the lift auger 32 to and towards another storage vessel.

Figure 2:
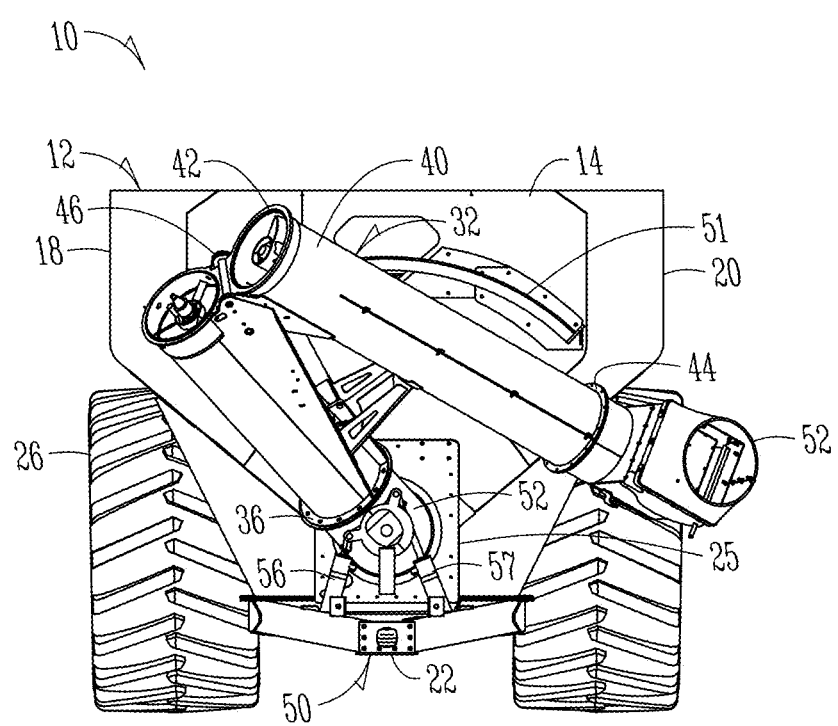
FIG. 2 is a front elevation view of the agricultural wagon of FIG. 1.
Figure 3:
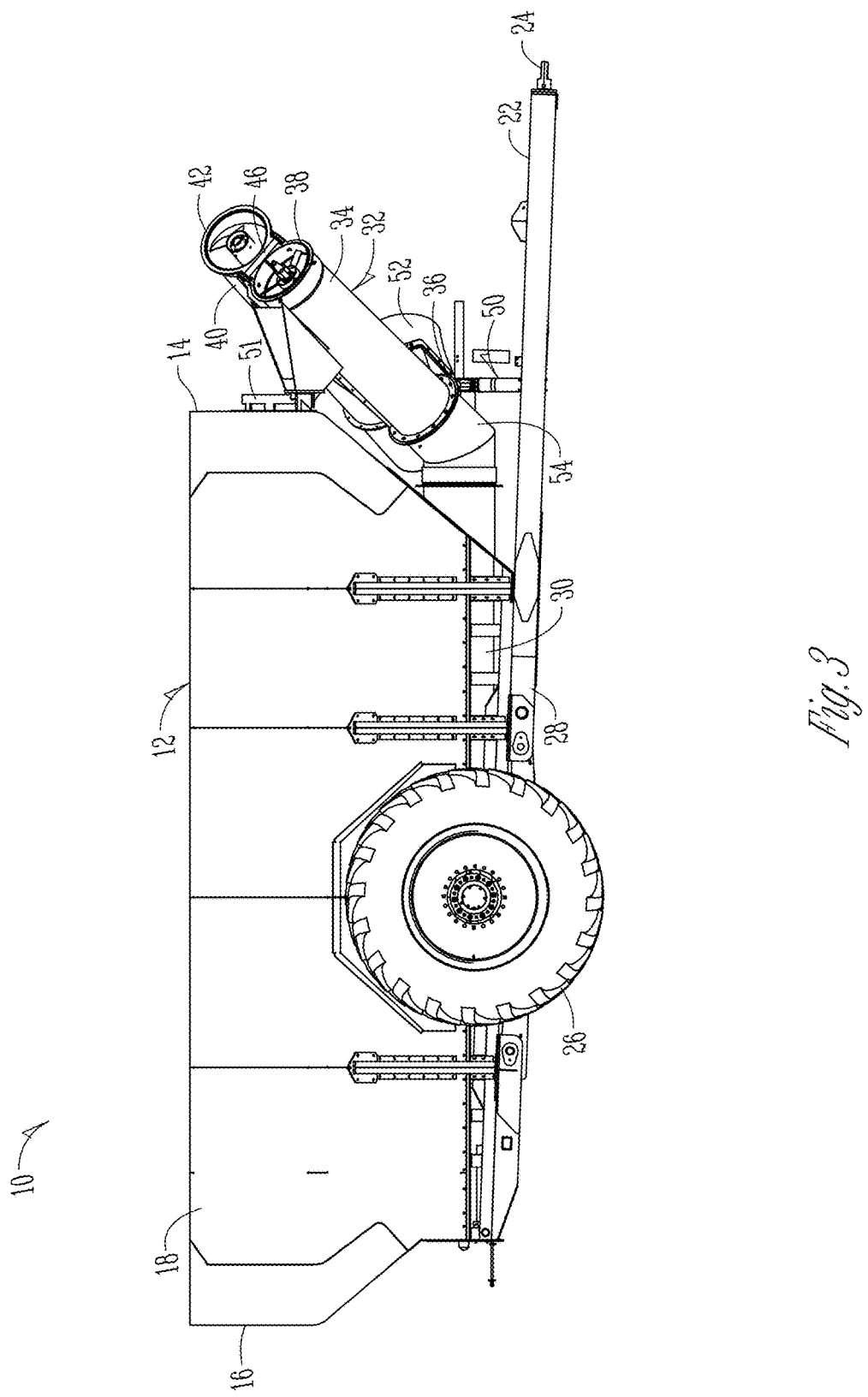
FIG. 3 is a side elevation view of the agricultural wagon of FIG. 1.

The lift auger 32, as shown in the figures, can be a pivoting or folding style auger. Such an auger is disclosed in U.S. patent application Ser. No. 12/728,042, which is hereby incorporated in its entirety. For example, as shown in FIGS. 1-3, the lift auger 32 is in a folded or transport manner wherein an upper portion 40 of the lift auger 32 is pivoted at a pivot point 46 relative to a lower section 34 of the lift auger 32. As is shown in FIG. 2, this pivoting of the portions of the lift auger 32 can be done such that the fully folded lift auger 32 fits substantially within the front profile of the grain cart 10. The upper section 40 of the lift auger 32 can be folded to rest generally within a saddle member 35, as is shown throughout the figures. The saddle 35 is shown to extend from the lower section 34 of the lift auger and towards the left side of the grain bin 12. In such a configuration, the lift auger would be positioned at the front, right corner and folded upon itself until the upper section 40 is positioned at the saddle 35, which keeps the profile of the folded auger within the general profile of the front of the grain wagon 10. Providing so allows an operator of the tow vehicle to be sure that the portions of the auger will not run into an obstruction during transport of the grain cart 10. When the lift auger 32 needs to be operated to move the grain, however, the upper portion 40 can be pivoted relative to the lower portion 34 to a position shown generally in FIGS. 4 and 5, with the upper and lower sections 40, 34 aligned and in communication with one another to be able to extend the upper end 44 of the lift auger 32 and the hood above a top of a storage vessel to dispense the grain into said vessel. An actuator can be provided and connected between the upper and lower sections so as to extend and retract to unfold and fold the sections of the lift auger 32.

Therefore, to provide the folding of the lift auger 32, the lift auger 32 includes a lower section 34 and an upper section 40, which are pivotable relative to each other by either a first pivot point 46 or a second pivot point. The lower section 34 of the lift auger 32 includes a lower end 36 and an upper end 38. The lower end 36 of the lower section 34 of the lift auger 32 is operatively connected to the floor auger 30. Thus, the grain moved by the floor auger 30 continues into the lower end 36 of the lower section 34 of the lift auger 32. In addition, there may be an auger connector 54 between the floor auger 30 and the lower section 34 of the lift auger 32, as is shown in FIG. 10. This may also be known as the grain transfer case. Such a grain transfer case 54 may be a variable angle auger connector, which includes at least partially an angled component extending from a horizontal component to connect the floor auger 30 to the lift auger 32. The auger connector 54 may also be operatively connected to the power takeoff 62 of the tractor 60, in a manner similar to that shown in FIG. 11 for the floor auger 30. For example, the auger connector 54 may include a driven mechanism, such as a belt chain or gear chain, which is activated by the power takeoff 62. Such activation can reorient the auger connector 54 to rotate, pivot, or otherwise cause the lift auger 32 to be moved relative to a first position. The auger 32 may be moved to adjust the height or reach of the end of the auger, or it may be reoriented to position the hood 52 of the auger 32 at the opposite side of the grain cart 10 itself. Furthermore, the auger connector may include a gear or series of gears that, when driven, such as by the power takeoff, will cause the movement of the lift auger 32.

The lower section 34 of the lift auger 32 is operably and/or pivotally connected to an upper section 40 of the lift auger 32. The upper section 40 of the lift auger 32 includes a lower end 42 and an opposite upper end 44. The lower end 42 of the upper section 40 can be pivotally aligned with the upper end 38 of the lower section 34 of the lift auger 32. However, when moved to a transport configuration, the upper end 38 of the lower section 34 can become detached from the lower end 42 of the upper section 40 and the two sections can be pivoted, swiveled, or otherwise moved relative to one another to fold the upper portion towards the saddle 35 extending from the lower portion, as is shown in FIG. 2.

The upper and lower sections 40, 34 of the lift auger 32 can be pivotally connected to each other by a single pivot point or, according to some aspects of the invention, by two pivot points. When a single pivot point 46 is utilized, the lift auger 32 can be positioned at or near the right, front corner of the grain cart 10 before folding the upper portion 40 relative to the lower portion 34, as is shown in FIG. 1. However, when a first and second pivot point are utilized, the lift auger 32 can be folded when the lift auger 32 is at either the left front corner of the grain cart 10 or the right front corner of the grain cart 10. The use of the dual pivot points would allow the upper portion 40 of the lift auger 32 to be folded either direction towards the lower section 34 of the lift auger 32 to place the folded lift auger 32 generally within the front profile of the grain cart 10.

It is contemplated in the preferred embodiment that the lift auger 32 includes a single pivot point. As shown in the figures, the typical configuration of the lift auger 32 will be such that it is positioned at the right, front corner of the grain bin 12. Furthermore, the lower section 34 of the lift auger 32 includes a saddle 33 to receive and hold the upper section 40 when folded in the transport configuration of the grain cart 10. The folding and unfolding actuator, which can be a hydraulic actuator, pneumatic actuator, electric actuator, or some combination thereof, is utilized to unfold the lift auger 32 until a portion of it rests within the saddle 33, where it can be held during transport of the grain cart 10. As shown in some of the figures, the saddle 33 is oriented generally at a left side of the lower section 34 of the lift auger 32. Therefore, in such embodiments, the lift auger would have to be positioned at the right, front corner in order to be folded with the upper and lower sections 40, 34 being within the front profile of the cart. However, it should be appreciated that, according to at least some aspects, there could be a saddle on either side or the single saddle could be positioned on the opposite side such that the lift auger 32 would fold the opposite direction to be positioned in the transport configuration.

A hood 52 can be positioned at the upper end 44 of the upper section 40 of the lift auger 32. The hood 52 is utilized to aid in directing the grain or other material moved by the lift auger 32 in a direction towards a storage vessel. Thus, the shape and configuration of the hood 52 may be varied in order to best control the direction, flow characteristics, and speed of dispensement of the material. Furthermore, the present invention contemplates that the hood 52 may be connected to the lift auger 32 such that the hood 52 can be rotated, pivoted, or otherwise able to move relative to the upper section 40 of the lift auger 32. This would allow the operator greater control over the direction of the grain or other material being dispensed via the lift auger 32. When the lift auger 32 is moved from the left front corner to the right front corner, the rotation and/or pivoting of the hood 52, as shown by the arrow 70 in FIG. 6, allows the grain to be directed from a generally left manner to a right manner. Thus, the controlled rotation and/or pivoting of the hood 52 provides for greater control over the direction of the dispensement of the grain or other material. The movement of the hood 52 can be controlled in a number of ways. Actuators could be used with a track, such as gear teeth, to rotate the hood. Additional actuators could be used to tilt or otherwise pivot the hood. Still other ways, such as ring gears, worm gears, rack and pinion systems, cams, and/or some combination could be used to manipulate the hood, such as be rotating, pivoting, tilting, extending, or otherwise moving the hood to adjust a flow characteristic (e.g., flow rate, flow direction, pitch, angle, flow location, etc.) of the grain from the cart towards a storage vessel.

Figure 12:
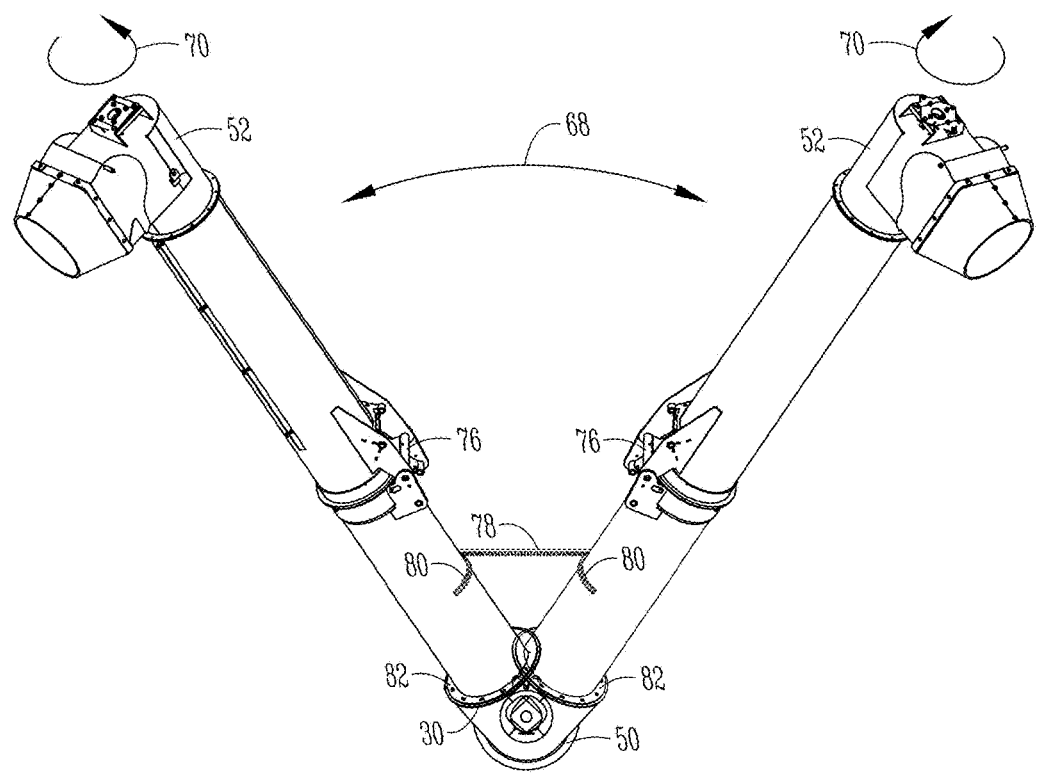
FIG. 12 is a view of a control system and assembly for moving and rotating the lift auger from side to side of a grain cart.

Another way to rotate the hood 52 is shown in FIG. 12. As shown in FIG. 12, the lift auger 32 includes the lower section 34 and the upper section 40. However, according to aspects of this exemplary embodiment, the entire lift auger 32, including the hood 52, will rotate in the direction of the arrows 70 as the auger pivots from one side to the other, or in the direction of the arrow 68. A fixed, curved rack gear 78 can be attached to or otherwise positioned at or near the front wall 14 or back wall 16 of the storage bin 12 of the cart 10. The gear 78 can also be attached to another component of the cart 10 such that it will interact with the lift auger 32. The lift auger 32 includes an auger curved rack gear 80 positioned thereon and in communication with the fixed gear 78. As the lift auger control mechanism 50 begins to pivot the lift auger 32 from one side to the other, the gears 78, 80 will interact to cause the lift auger 32 to rotate, such as at a rotary union 82. For example, the lift auger 32 may be rotatedly connected to the control mechanism 50. This will allow the lift auger, either the lower section or both the lower and upper sections, to rotate relative to the control mechanism 50. Therefore, the lift auger 32 will rotate as it pivots, which will rotate the orientation of the hood 52 between the positions shown in FIG. 12. In other words, the auger 32 is auto-rotated when transitioned from side to side. In such a situation, the hood 52 need not any additional mechanism to reorient, such as by rotating and/or re-elevating.

Furthermore, the configuration shown in FIG. 12 would require a single hinge 76 for folding the lift auger between field use and transport configurations. As the lift auger 32 rotates as it pivots, the hinge 76 will be oriented towards the interior, which will allow the upper section 40 of the lift auger 32 to be folded upon the lower section 34 when the auger is positioned at either side of the grain cart 10. Thus, a single folding cylinder or mechanism can be used to fold the auger, no matter the location of the auger, such that the auger will be folded generally or substantially in front of the cart 10 with the folded auger being maintained substantially within the front profile of the grain cart 10. However, it is desired that the auger 32 be folded in the same configuration each time, the assembly can be easily and quickly moved to reorient the auger and hood such that the auger will be folded from the same side and in the same configuration each time.

Figure 6A:
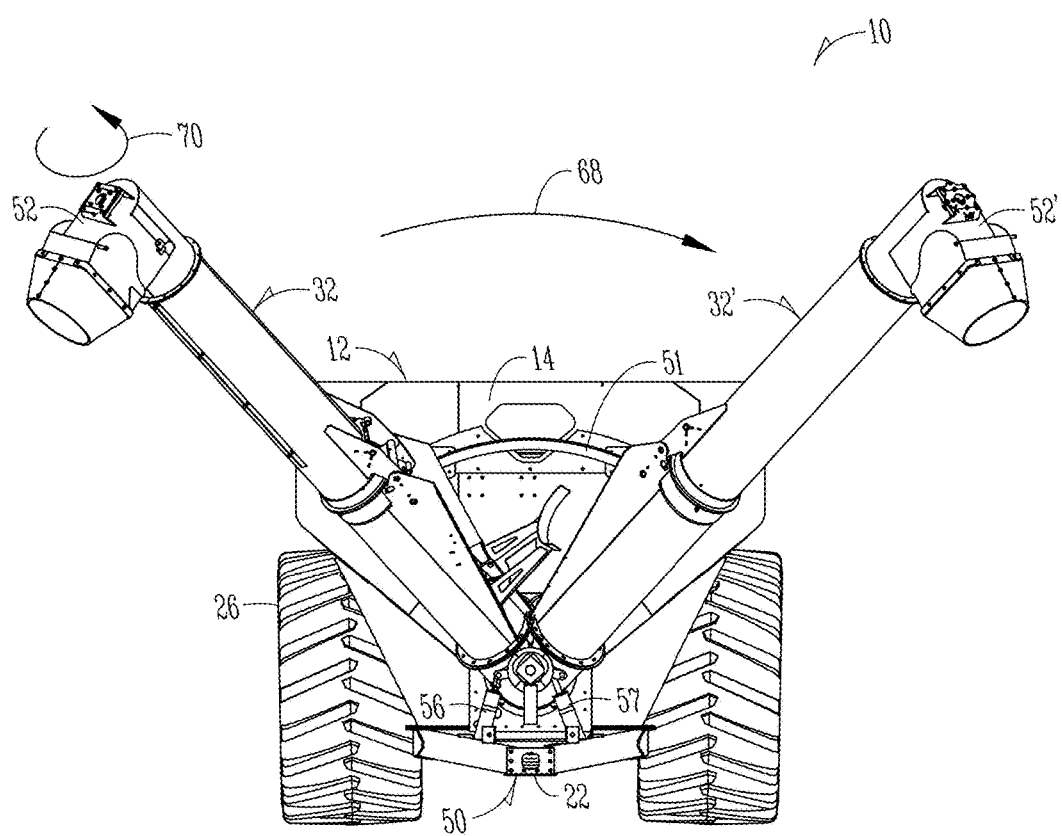
FIG. 6A a front elevation view of the agricultural wagon of FIG. 4 with the lift auger shown at both sides of movement.
Figure 6B:
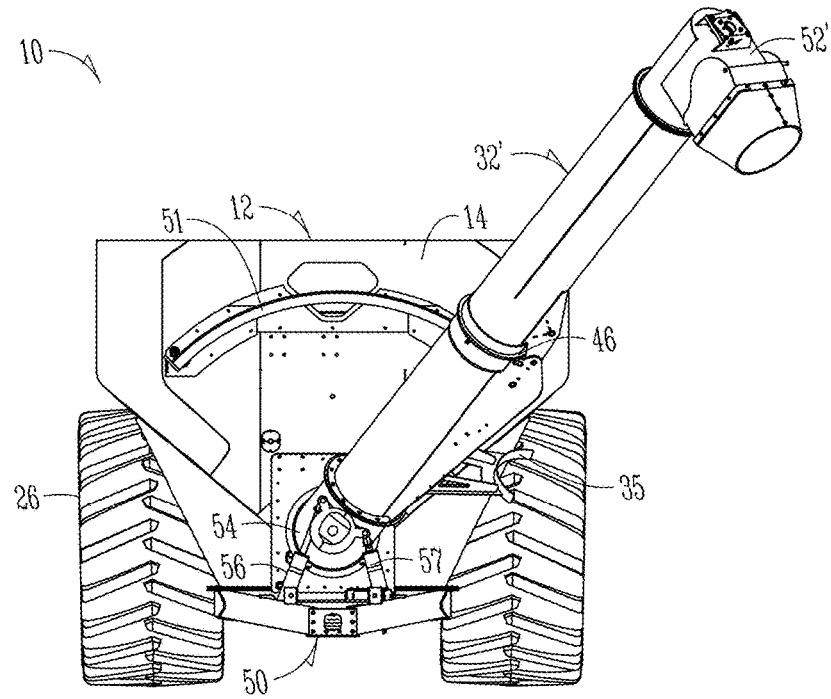
FIG. 6B is a front elevation view showing the lift auger extended at the front, right corner of the wagon.
Figure 6C:
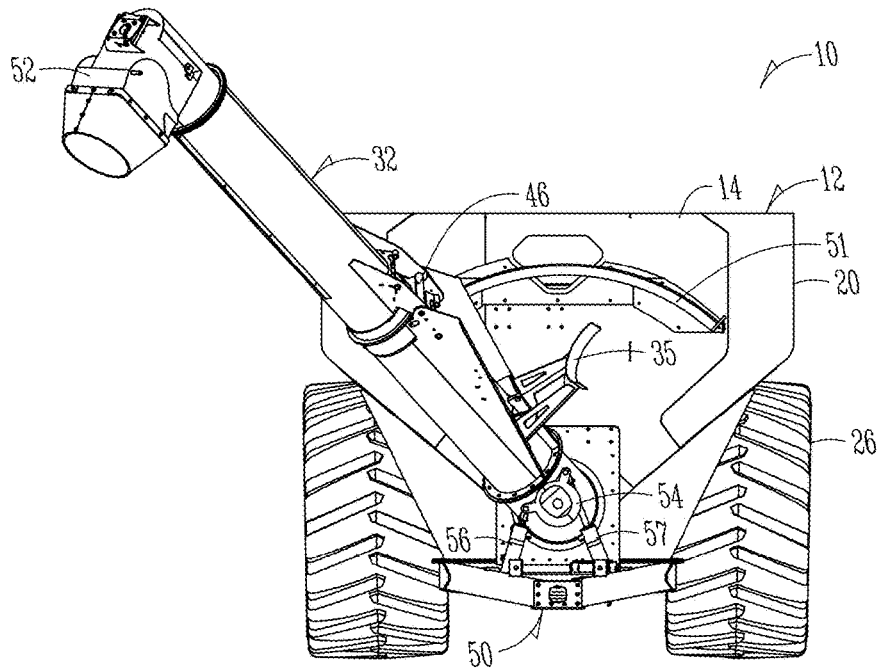
FIG. 6C is a front elevation view showing the lift auger extended at the front, left corner of the wagon.

As mentioned, it may be desirable to move the location of the lift auger 32 from a left front corner to a right front corner of the grain cart 10, or vice versa. This is illustrated in FIGS. 6A-6C. As shown in the figures, the lift auger 32 is positioned at the front, right corner of the cart 10, while the lift auger 32' is positioned at the front, left corner of the cart 10. The lift auger 32, 32' can be moved via a control mechanism 50, as will be explained. For example, as shown in some figures, the control mechanism includes a rotatable grain transfer case 54, first and second actuators 56, 57 connected to a rocker device 59, and a guide member 51. Benefits from this may include an easier sight for visualizing the dispensing of the grain from the lift auger 32 of the grain cart 10. Further advantages that are included with the movement of the lift auger 32 include the ability to dispense on either side of the grain cart 10. This would provide a greater number of options or areas to dispense the material. When the lift auger 32 is fixed at one side or one location relative to the grain cart 10, the grain cart 10 must be positioned in exactly the right manner to dispenser the grain from the cart 10 to a storage vessel. The ability to move the lift auger 32 from one side of the grain cart 10 to the other provides the ability to be more flexible when positioning the grain cart 10 relative to the storage vessel, which is to receive the grain. Thus, the movement of the lift auger 32 from one side of the cart 10 to the other can provide greater efficiency in moving and transporting grain, which will decrease the amount of time needed to unload the grain, which will in turn decrease the overall time of harvest. This can be extremely important, as weather conditions may affect or limit the amount of time of harvest or of grain transport. By providing a greater flexibility for the location of the dispensement on either side or somewhere in between of the grain cart 10, a farmer is able to accomplish a greater deal of work without having to be sure to align the cart 10 in the exact same manner every single time.

Figure 5:
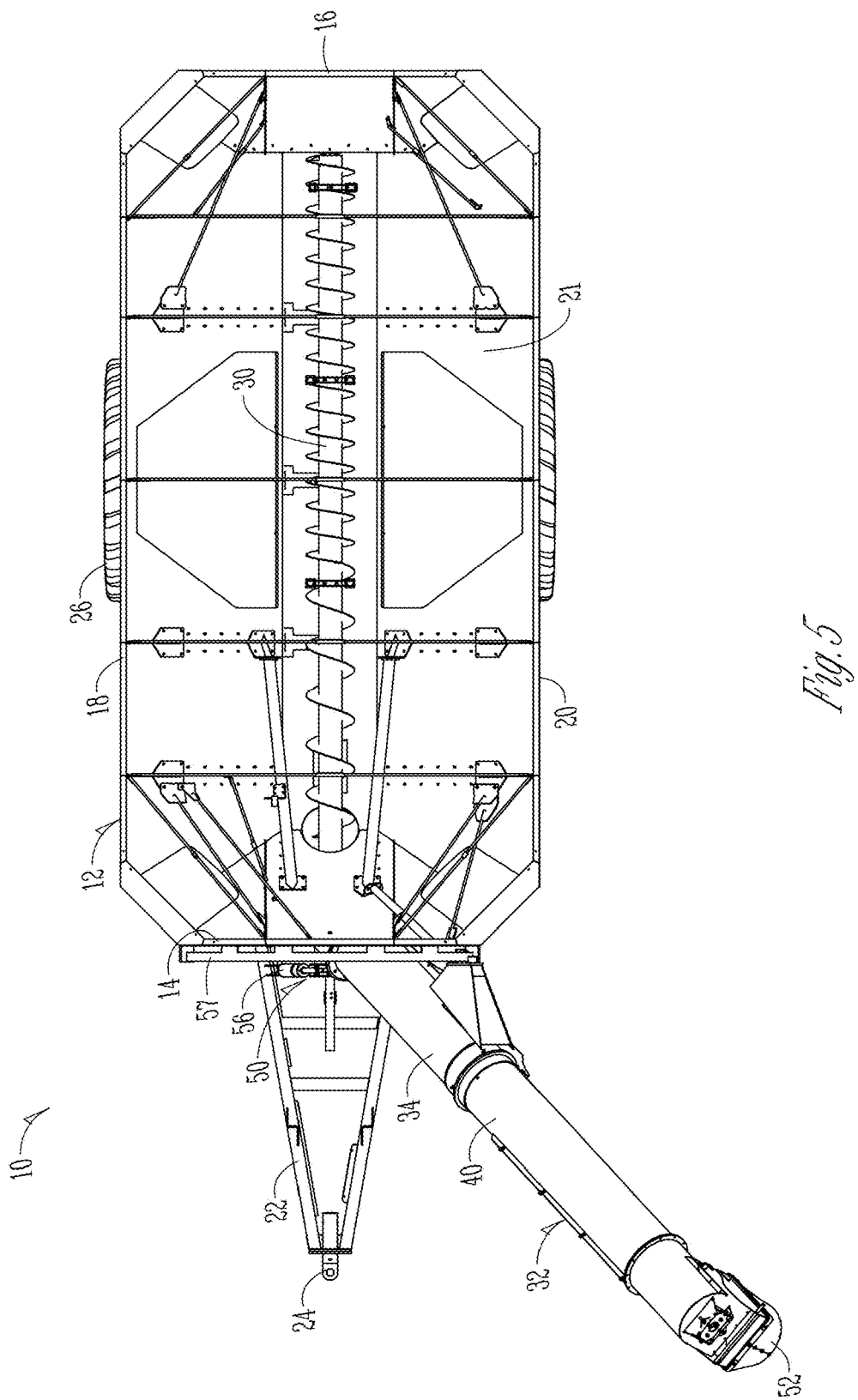
FIG. 5 is a top plan view of the agricultural wagon of FIG. 4.
Figure 7:
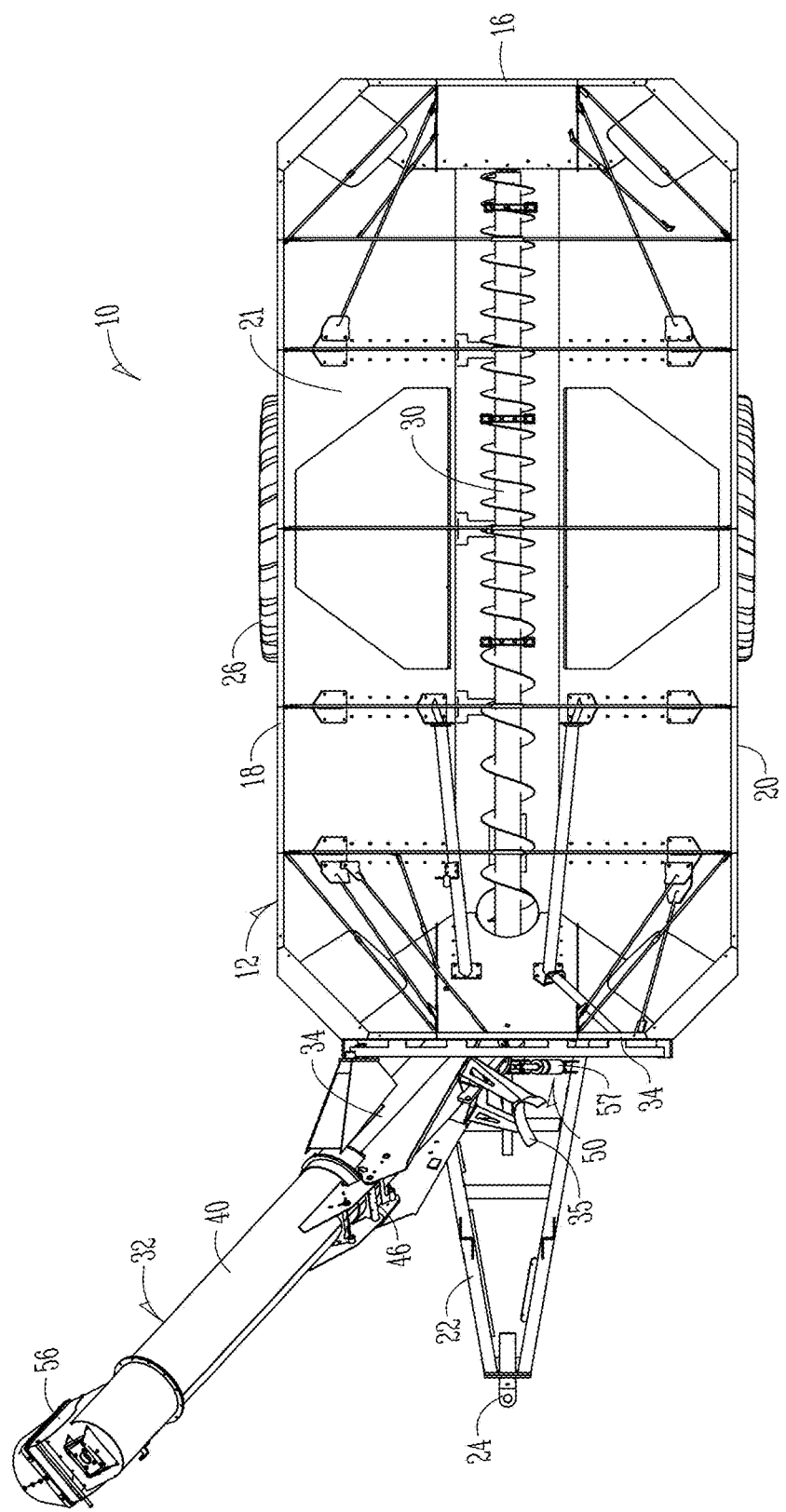
FIG. 7 is a top plan view of the agricultural wagon of FIG. 6C.
Figure 8:
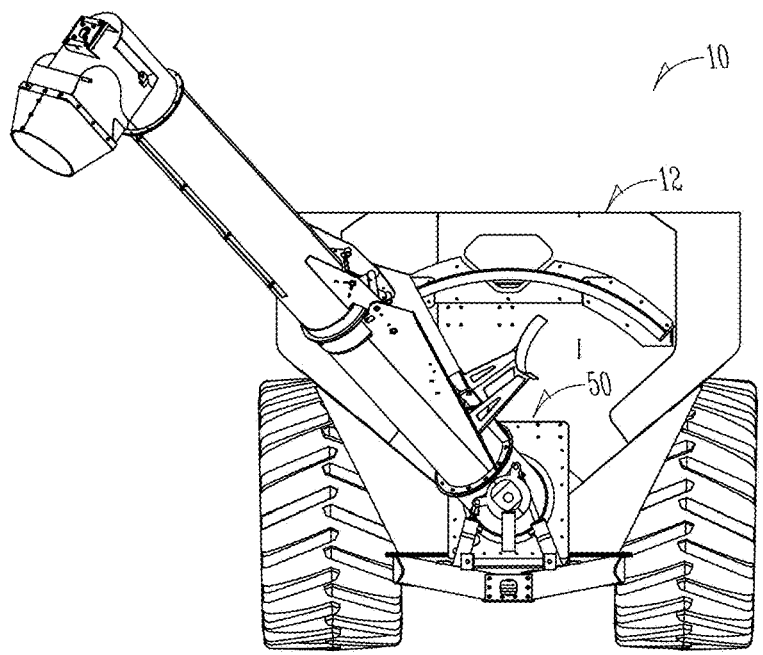
FIG. 8 is a front elevation view of an agricultural wagon showing a control system for moving the lift auger between one side of the agricultural wagon and the other.

FIGS. 5-7 disclose the grain cart 10 of the invention with the lift auger 32 moved between the left front corner of the grain cart 10 and the right front corner of the cart 10. The moving of the lift auger 32 shows but a few of the possible locations of the auger. For example, while the arrow 68 of FIG. 6 shows the movement of the auger 32 from one side of the grain cart 10 to the other, the auger 32 can be moved, pivoted, adjusted, etc. without completely switching sides on the grain cart 10. The lift auger 32 can be adjusted while generally on one side of the cart to adjust the height, reach, angle of discharge, etc. to aid in the discharge of the material from the cart. FIG. 6 also shows how the hood 52 of the lift auger 32 can be rotated, such as by the rotation shown by the arrow 70, when moving from one side of the grain cart 10 to the other. Furthermore, the head 52 can be adjusted, including rotating, pivoting, tilting, etc., without moving or with minimal moving of the lift auger to also adjust the discharge height, angle, direction, etc. of the auger.

Figure 9:
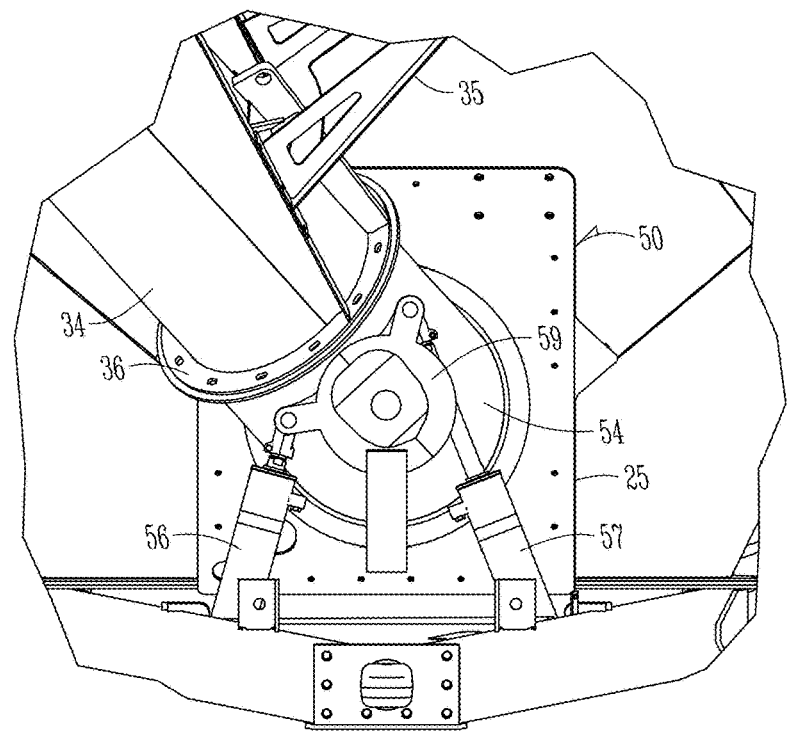
FIG. 9 is an enlarged view of the control system of FIG. 8.

The movement of the lift auger 32 from and between generally the front or rear corners of the cart 10 can be done in a number of ways. For example, FIGS. 1-9 disclose a control mechanism 50 for initiating and controlling the movement of the auger 32 from one corner to the other. The mechanism 50 shown in the figures includes a rotatable grain transfer case 54 that includes a section of auger connecting the floor and lift augers 30, 32. The case is angled to align the augers and can be positioned towards either front corner of the cart 10. Connected to a portion of the case 54 is a rocker member 59, as is best shown in FIG. 9. A first actuator 56 is shown connected to a first (right) side of the rocker member 59, and a second actuator 57 is positioned on the opposite side (left) of the rocker member 59. The rocker member can be fixed in position relative to the transfer case 54 and can include portions connected to rods of the actuators. The actuators 56, 57 can be generally any type of actuator capable of rotating the lift auger, including, but not limited to, hydraulic actuators, pneumatic actuators, linear actuators, electric actuators, and/or some combination thereof. The extension of a rod of one of the actuators will cause the rocker member 59, and thus, the transfer case 54 to rotate. For example, extension of the second actuator 57 will cause the lift auger 32 to rotate towards the front, right corner of the cart 10, and vice versa. It should be appreciated that the actuators will work together such that extension of one can correspond to retraction of the other. The retraction could also aid in rotation of the lift auger 32, thus creating a push-pull by the actuators to rotate said auger 32. Therefore, it is also contemplated that an intelligent control be included to aid in the operation of the actuators separately and/or in sync.

Additional components of the mechanism for moving the lift auger 32 from one side of the cart to the other includes a guide member 51. A roller member can extend from a rear portion of the lift auger 32 (either at the upper section 40 or lower section 34) and be movable along the guide member 51. The guide member 51 includes a shelf-like guide, track, or the like, for working in conjunction with the roller member to allow the roller member to roll, move, or otherwise transport along the guide. For example, a bearing-type member is contemplated as being used in conjunction with the guide member for relatively easy rolling along said guide member 51. Such a configuration would include a roller member comprising a rigid material and extending from the lift auger 32 to reside on and/or in a track of the guide 51. The roller would be rollable within the guide to aid in supporting the movement of the lift auger 32. The roller and guide member operate to guide the movement of the lift auger 32 as the actuators push and/or pull the auger via the rocker 59. The guide member 51 may also include stops at the ends of the guide to stop the rotational movement of the lift auger 32. This aids in preventing over rotation of the lift auger 32 and provides an additional safety element for the grain cart 10.

Therefore, in such a situation with the control mechanism 50 as shown and described, a single pivot point 46 is included. The sections of the lift auger can be first extended from the transport configuration shown in FIG. 2 to the extended and use configuration shown in FIG. 4. As mentioned, this can be done with an actuator at or near the pivot point 46, as is disclosed in U.S. patent application Ser. No. 12/728,042, which is hereby incorporated by reference in its entirety. The location of the dispensing point is then determined. If the dispensing location is to be at the front, right corner of the cart, as shown in FIG. 4, the cart 10 is in position for dispensement.

Figure 4:
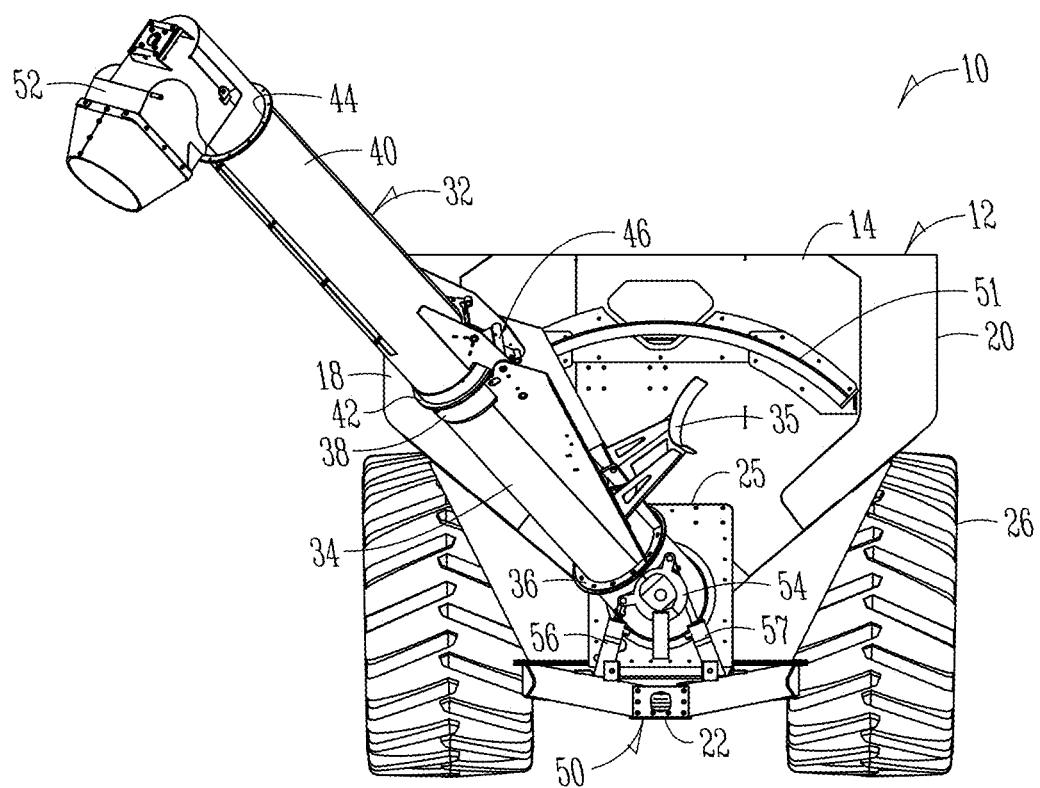
FIG. 4 is a front elevation view of an agricultural wagon with the lift auger in an extended position.

However, if it is determined that the dispensing position should be at the front, left corner of the cart 10, the lift auger 32 will be rotated from the configuration shown in FIG. 4 to the configuration shown in FIG. 6C. The control mechanism 50 will activate one or both of the actuators, such as by extending the first actuator 56 and retracting the second actuator 57. This will cause the rocker member 59 and transfer case 54 to rotate, and the roller member to travel along the guide member 51. The rotation will continue until the roller member reaches the end of the guide 51, and the actuators are deactivated. The hood 52 can then be moved, such as by rotation in the direction of the arrow 70, to change the dispensing location of the hood towards the left side of the cart 10. The rotation could be accomplished in many ways, such as by actuators, gears, or some combination thereof.

It should be noted, with such a movement mechanism, the pivot point 46 will remain at the same location along the lift auger 32 between the lower section 34 and the upper section 40. This is shown in FIGS. 6A-6C, showing the location of the pivot point 46, as well as the saddle member 35.

Therefore, to revert from the use configuration shown in FIG. 6C to the transport configuration, the lift auger 32 would first have to be moved and/or rotated towards the front, right corner of the cart 10, such as shown in FIG. 7. The control mechanism 50 would operate in the opposite manner to move the lift auger in its extended manner, using one or both of the actuators and the guide member. The movement would continue until the lift auger 32 is returned to the position shown in FIG. 6B, with the roller member at the right end point of the guide. The folding actuator could then be activated to being folding the upper section 40 of the lift auger 32 relative the fixed, lower section 34 about the pivot point 46. The upper section 40 could be rotated to become positioned at least partially within the saddle member 35, at which point the lift auger could be positioned substantially within the front profile of the grain cart 10. At this configuration, the grain cart 10 would be in a transport configuration and ready to travel to another location.

As disclosed, the lift auger 32 may include a second pivot point between the lower portion 34 and the upper portion 40 of the auger 32. For example, the first and second pivot points may include locks or other connections between the upper and lower sections 40, 34. Thus, when the auger 32 is extended in its use configuration, the locks will keep the lift auger 32 in its extended configuration. However, when the lift auger 32 is to be folded to a transport configuration, the locks may be broken or otherwise undone to allow the lift auger 32 to fold in either direction to fold the upper portion relative to the lower portion to fold the lift auger 32 within the front profile of the grain cart 10. In such a configuration, a second saddle could be included on the opposite side of the lift auger 32 to position and receive the folded, upper section 40 of the auger 32.

In addition, the grain cart 10 may include an intelligent control which is electrically connected to electronic locks and pivots. The electronic connection would allow the locks to be selectably locked and unlocked to allow the lift auger 32 to be folded in either direction upon a command from an operator or system. For example, the locks can be positioned at the first and second pivot points at the connection between the lower portion 34 and upper portion 40. When the lift auger 32 is positioned at the right front corner of the grain cart 10, and it is desired to be folded, the intelligent control can communicate with the first pivot point 46 to unlock the lock, and can further communicate to the second pivot point to maintain a locked connection between the lower portion 34 and upper portion 40 such that the upper portion 40 will rotate about the second pivot point. However, when the lift auger 32 is positioned at the opposite corner, the intelligent control will operate to unlock the opposite pivot point and to provide for pivoting of the upper portion 40 about the first pivot point 46. Therefore, the present invention contemplates that the lift auger 32 can be folded at any location between the left and right sides of the grain cart 10.

In addition, it is contemplated that the lift auger 32 may be pivotable, movable, or otherwise positionable between approximately 120 degrees from one extreme to the other. Preferably, the lift auger 32 is able to move between 100 and 120 degrees from a left-most position to a right-most position. However, as has been disclosed, the lift auger 32 is able to be positioned generally anywhere between the extreme left and right-most positions, to provide for greater flexibility of the location of dispensing out the lift auger 32.

Furthermore, as has been disclosed, while the figures show the location of the lift auger 32 at the front of the grain cart 10, the present invention contemplates that the lift auger 32 could be positioned at the rear of the grain cart 10. For example, the lift auger 32 could be placed in communication with the floor auger 30 at the rear left or right corners of the grain cart 10. The aspects of the present invention would still be able to be utilized to allow the movement of the lift auger 32 from the left rear corner to the right rear corner and therebetween.

The figures also show that the lift auger 32 is positioned outside the storage bin 12 of the grain cart 10. It is further contemplated that the lift auger 32 could be positioned within the storage bin 12. In such a case, the aspects of the invention allowing for the movement of the lift auger 32 from one side to the other remain and are included. For example, the lift auger 32 would remain in communication with the floor auger 30 and would provide that the grain cart 10 could dispense grain from either the left or right sides of the cart 10.

Further variations remain. For example, as has been mentioned, the invention contemplates the omission of the floor auger 30. In such a gravity fed grain cart 10, the lift auger 32 would be in communication with the bottom of the storage bin 12 of the grain cart 10. The grain in the cart 10 would be gravity fed towards the lift auger 32 for dispensing therefrom. However, the aspects of the invention that allow for the movement from the lift auger 32 to dispense from either side of the grain cart 10 would still be included in such a configuration of grain cart 10. For example, the means for moving the grain cart 10 to dispense from either side could be incorporated with the cart 10 to allow for the dispensement at either side of the cart 10. In such a manner, the lower end 36 of the lower section 34 could be positioned generally at a center portion of the grain cart 10 and the remainder of the lift auger 32 could be pivotable or otherwise rotatable at said location of the lower end 36 of the lower section 34.

An agricultural wagon including a lift auger capable of being moved such that the end dispense an agricultural product from either side of the wagon has thus been described. The present invention contemplates numerous variations, options and alternatives, and is not to be limited to the specific embodiments described herein. Other changes are considered to be part of the present invention.

What is claimed is:

1. An agricultural wagon, comprising:
   a storage bin supported by wheels and adapted to connect to a vehicle, the bin including front, rear, and side walls;
   a lift auger operatively connected to the interior of the storage bin and configured to move the particulate material at least partially upward and out of the storage bin;
   a control mechanism for orienting the lift auger at one of the sides of the storage bin or in between the sides, wherein the control mechanism comprises first and second actuators positioned on opposite sides of the lift auger to move said auger from one side to the other; and
   a rocker member attached between the first and second actuators and the lift auger at a lower end of the lift auger such that:
   a. the rocker mechanism connected to a transfer case;
   b. the first actuator connected to a first side of the rocker mechanism; and
   c. the second actuator connected to a second side of the rocker mechanism;
   d. wherein said first and second actuators actuable to rotate the rocker, transfer case, and lift auger; and
   wherein the lift auger and the rocker member in a substantially fixed axial location to rotate the rocker member and lift auger at a substantially similar axis.

2. The agricultural wagon of claim 1, further comprising a floor auger operatively connected to the storage bin and configured to move particulate material in a generally forward or rearward direction relative to the interior of the storage bin.

3. The agricultural wagon of claim 2, wherein the lift auger operatively connected to the floor auger to receive the particulate material from the floor auger.

4. The agricultural wagon of claim 3, wherein the transfer case is rotatably connected to the storage bin and comprises a connection between the floor auger and the lift auger.

5. The agricultural wagon of claim 4, wherein the control mechanism operatively connected to the transfer case.

6. The agricultural wagon of claim 5, further comprising a guide member positioned at the front wall of the storage bin and operatively connected to a portion of the lift auger such that the lift auger is guided by the guide member as it moves from one side of the storage bin to the other.

7. The agricultural wagon of claim 1, wherein the controller comprises an actuator positioned between the storage bin and the lift auger.

8. The agricultural wagon of claim 1, further comprising a dispensing hood operatively connected to the lift auger for directing the particulate material from said auger and being movable relative to the lift auger to change a characteristic of the dispensement.

* * * * *